Jan. 3, 1950  H. C. PAULSEN  2,493,207
MACHINE FOR USE IN THE MANUFACTURE OF INSOLES
Filed Jan. 31, 1947  6 Sheets-Sheet 1

Inventor
Hans C. Paulsen
By his Attorney
Thomas␣

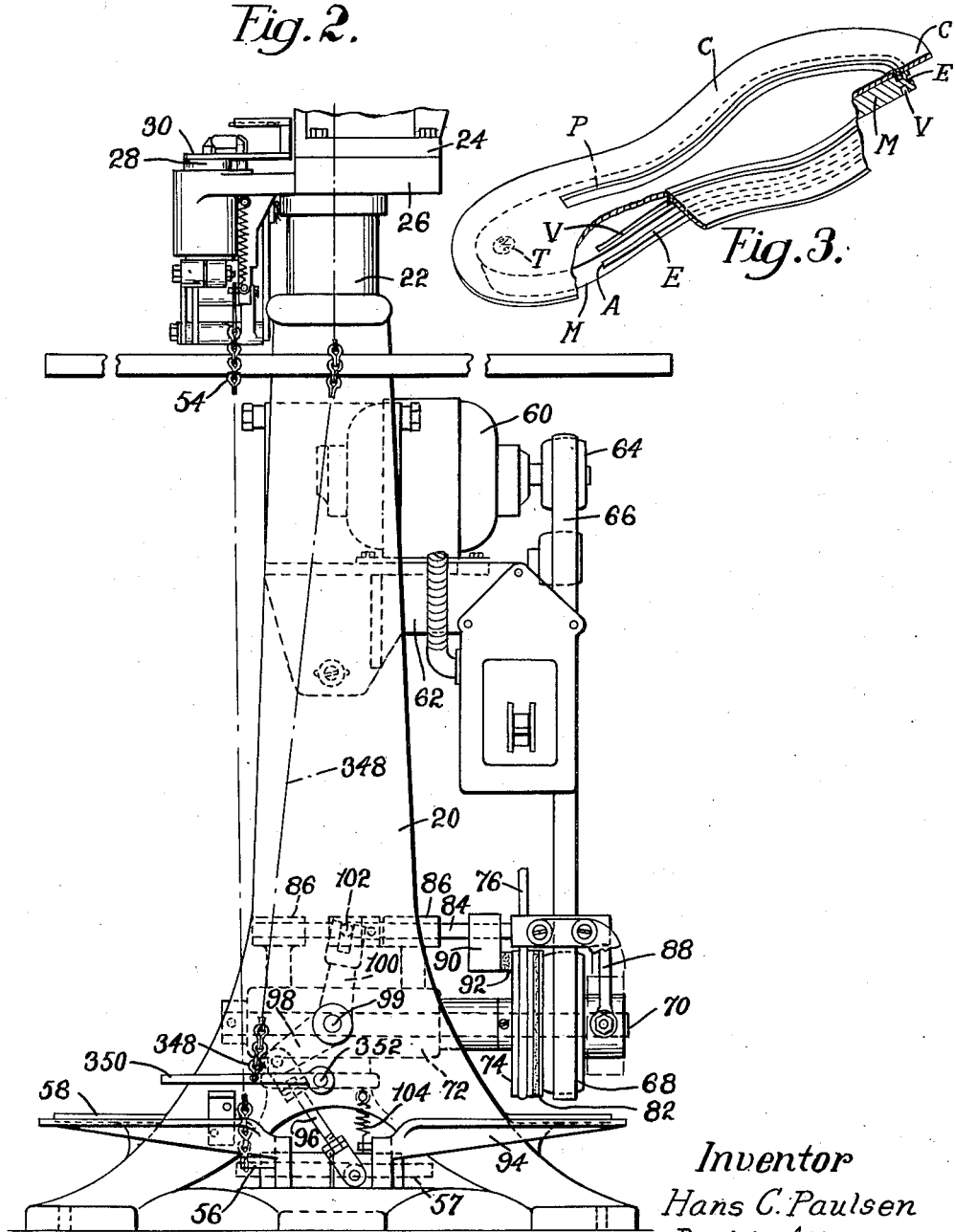

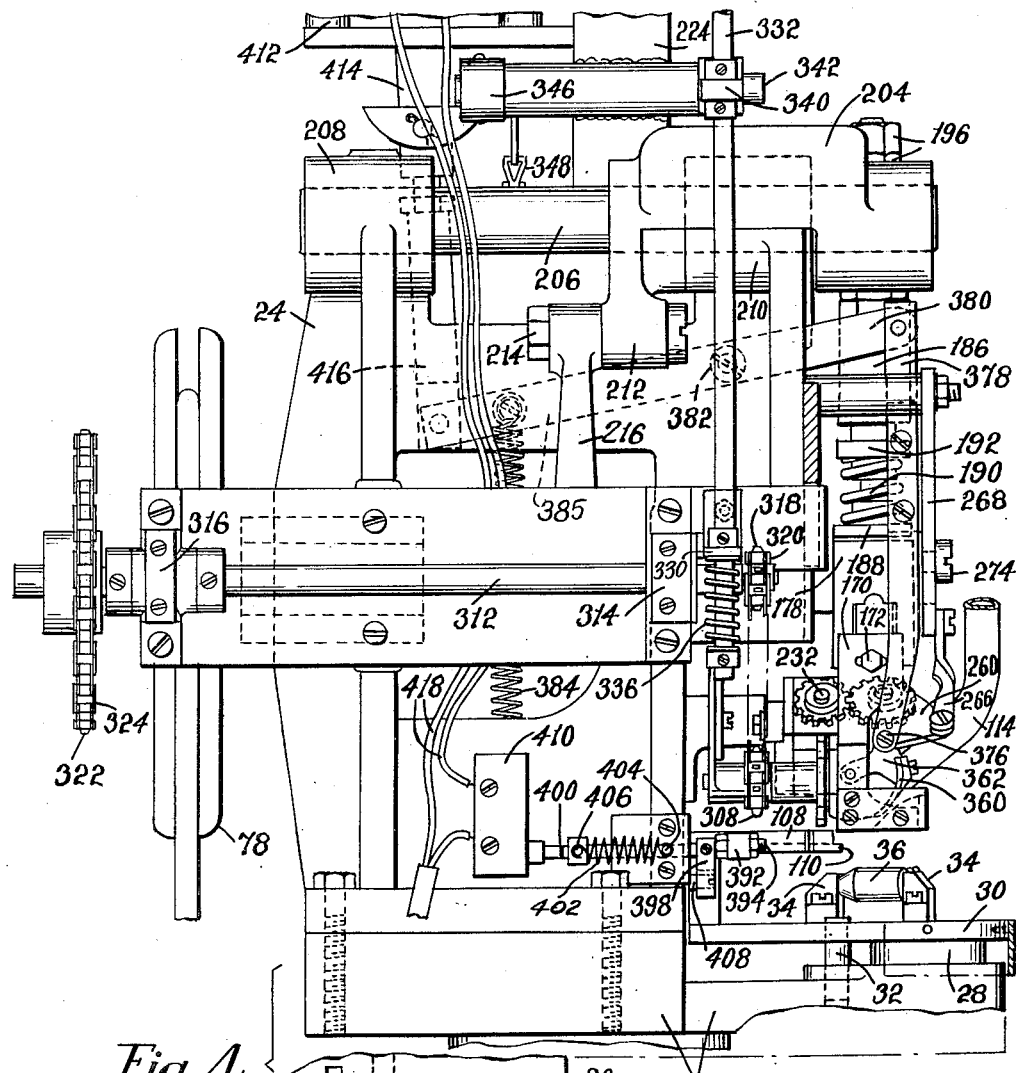
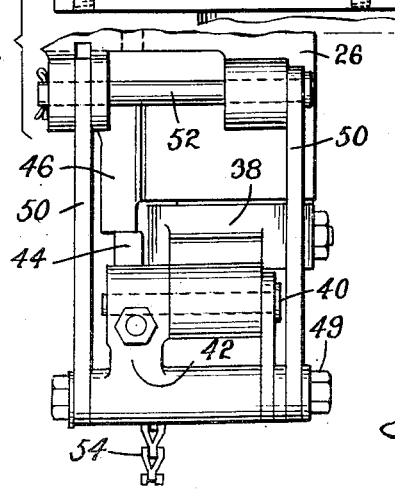
Fig. 4.
Inventor
Hans C. Paulsen
By his Attorney
Thomas Hogan

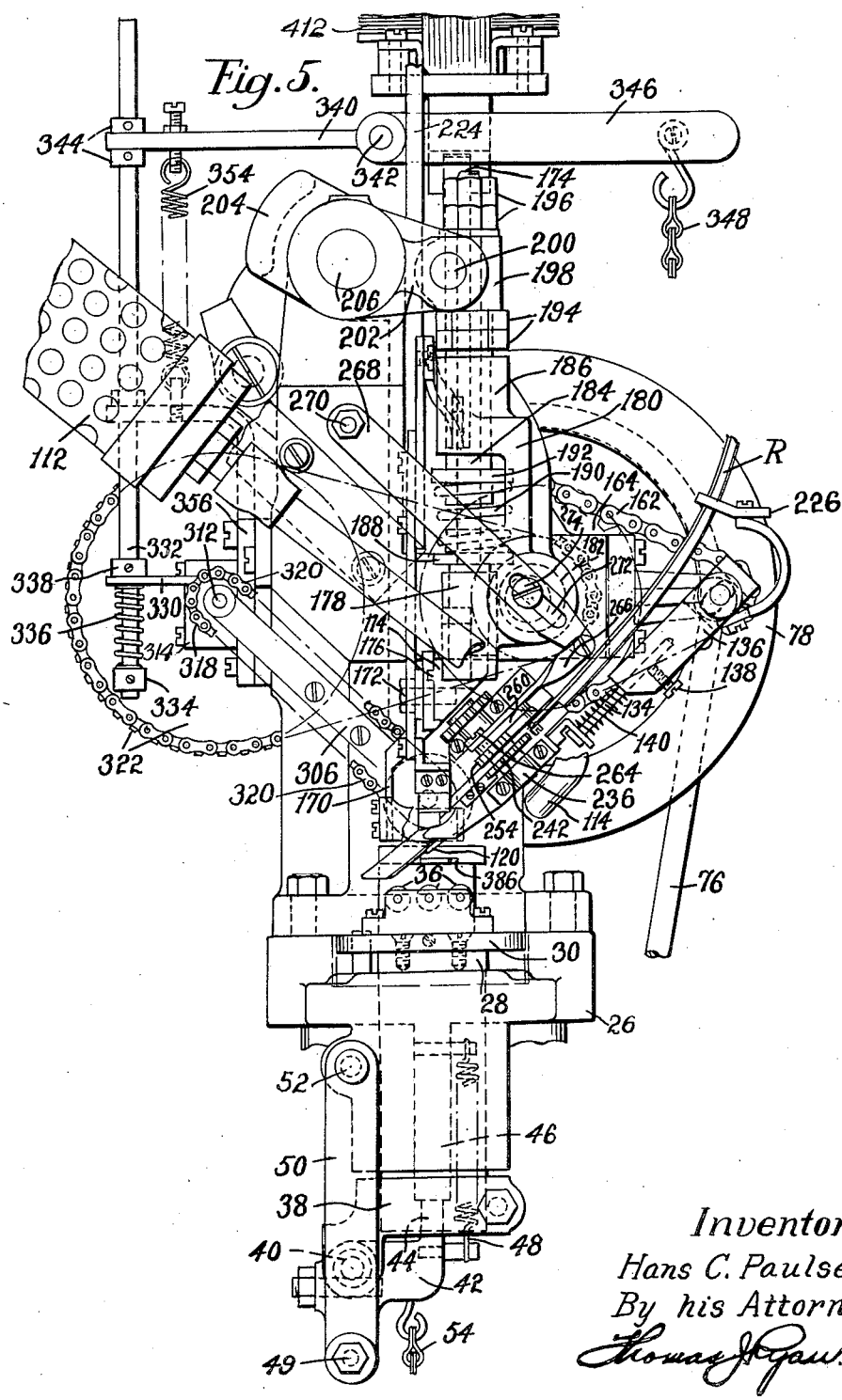

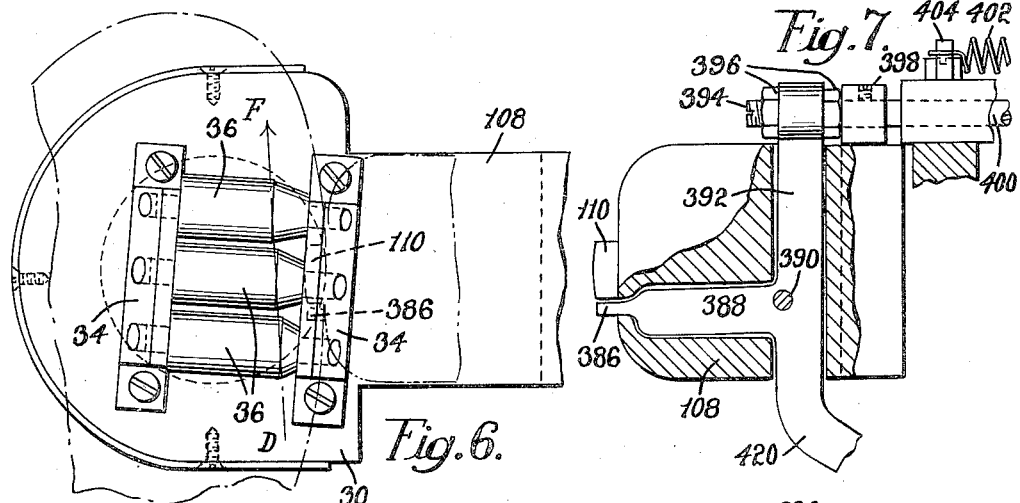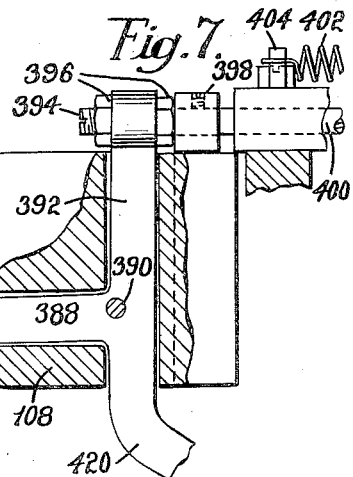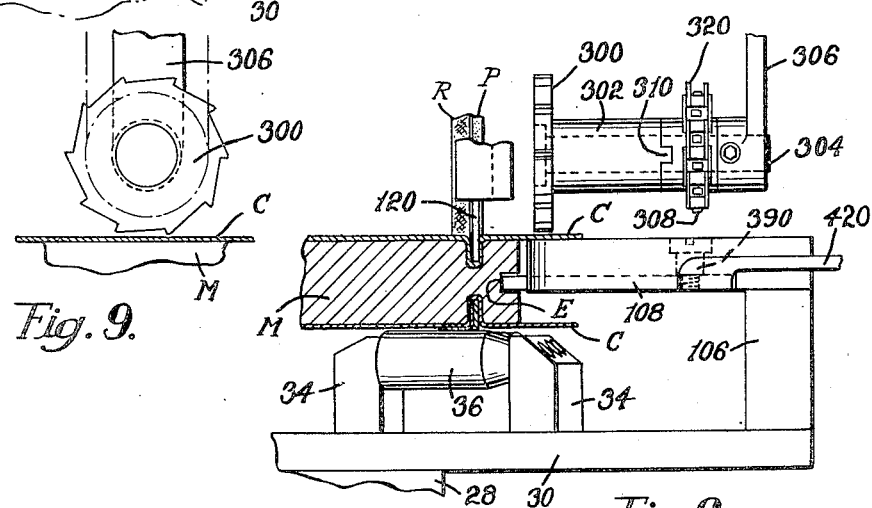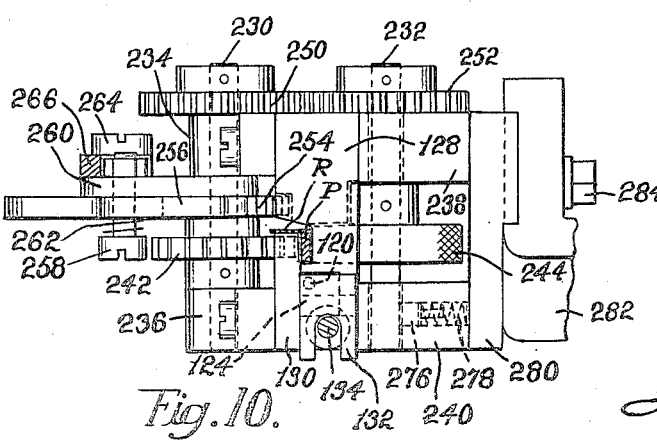

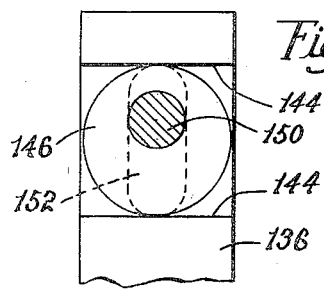
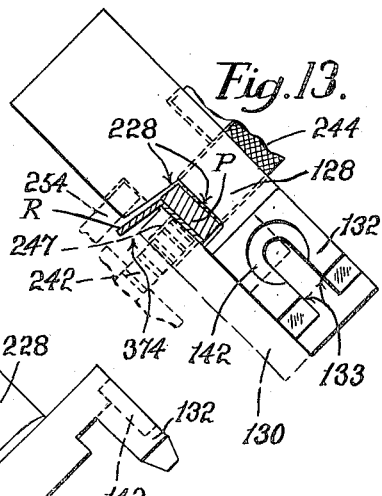
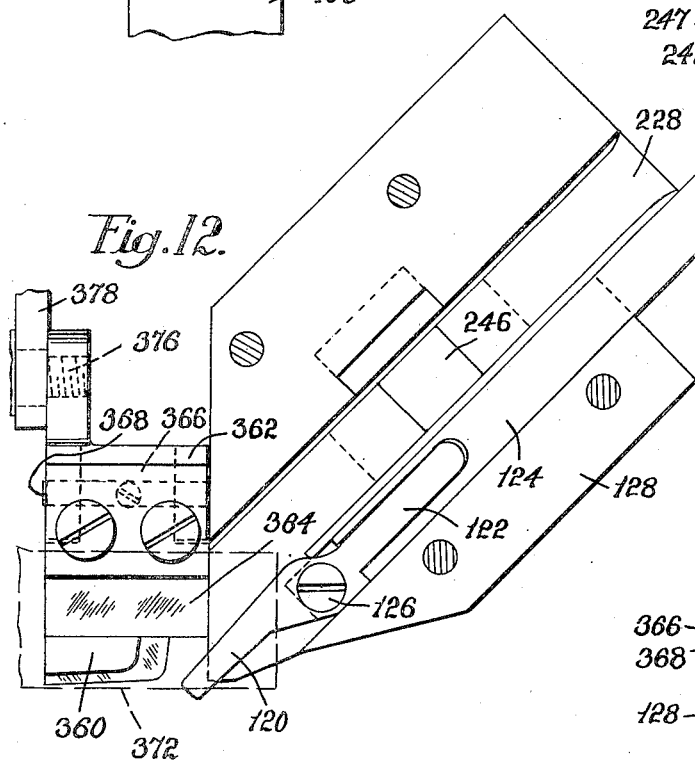
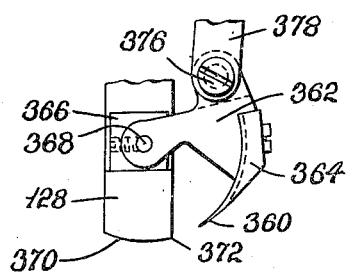
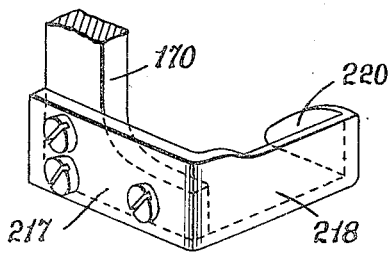
Inventor
Hans C. Paulsen
By his Attorney Patented Jan. 3, 1950

2,493,207

UNITED STATES PATENT OFFICE 2,493,207

MACHINE FOR USE IN THE MANUFACTURE OF INSOLES

Hans C. Paulsen, Medford, Mass., assignor to United Shoe Machinery Corporation, Flemington, N. J., a corporation of New Jersey Application January 31, 1947, Serial No. 725,415

38 Claims. (Cl. 12—20)

This invention relates to machines for use in the manufacture of insoles, particularly welt insoles.

An object of the invention is to provide a machine for use in making insoles by the practice of the method disclosed and claimed in an application for Letters Patent of the United States Serial No. 717,121, filed December 19, 1946, in the name of Stanley M. Griswold, such use being facilitated by the provision of an insole matrix made as disclosed in an application for Letters Patent of the United States Serial No. 717,122, filed December 19, 1946, in the names of Stanley M. Griswold and myself.

The machine, while not limited to such use, is best explained by assuming a supply of free matrixes made as disclosed in the second application above mentioned.

Briefly described, such matrixes consist of insole-shaped pieces of firm, solid material such as hardwood, hard rubber or plastic, each matrix having flat, parallel, opposed faces and each face having therein a rib-forming groove located in relation to its edge as a rib is to be located on the insole. The edge face of each matrix is provided with a groove the bottom of which is at a uniform distance from the rib grooves, the edge groove ending at the heel breast line. Adjacent to the heel end of the matrix is a tang upon which a layer of canvas may be impaled to assist in locating the canvas with respect to the matrix.

A feature of the invention consists in a support for the matrix and a tool for working the canvas into a rib groove of the matrix and means for relatively moving the tool and the matrix to cause the tool to work successive portions of the canvas into the groove progressively. Preferably, a yieldingly actuated, rapidly reciprocated tucking tool is provided which moves in a path substantially inclined to the plane of the face of the matrix presented to it.

Another feature of the invention consists in a stop or guide to engage the end of the groove in the edge face of the matrix to locate the matrix for the start of the tucking operation, said stop acting to arrest movement of the matrix when it is engaged by the end of the edge groove at the opposite side of the matrix, thus indicating the end of the tucking operation. The stop or guide, by engaging the bottom of the groove, serves to locate the matrix laterally for the proper action of the tucking tool.

A further feature of the invention consists in means for presenting the end of a core piece over the rib groove in the matrix where the tucking operation begins and means for forcing the core piece into a fold of canvas in the groove concomitantly with the progressive formation of the fold by the tucking tool. The core piece is forced into the groove by a hammer reciprocating at right angles to the face of the matrix which is uppermost. The reciprocations of the hammer are preferably timed to occur less frequently than the reciprocations of the tucking tool; for example, there may be four reciprocations of the tool to one of the hammer. As illustrated, the hammer is operated through yielding means and is given, while in contact with the work, a horizontal movement to feed the work.

As a further feature of the invention there is provided means for feeding the core piece, which means is operated independently of the movement of the hammer for feeding the work. This means advances the core piece at a different rate from that at which the matrix is fed and preferably is arranged to feed the core piece at a rate somewhat in excess of the rate at which the matrix is fed. Thus a longitudinal compression rather than tension is applied to the core piece so that distortion of the insole when removed from the matrix is avoided.

To facilitate the feeding of the matrix and to assist in holding it against the stop or guide which engages the edge groove, the matrix support is provided with antifriction means which may consist of a plurality of rollers having parallel axes which are inclined at an obtuse angle to the direction of feed. As illustrated, the axes of the rollers are horizontal and their inclination to the direction of feed is about ninety-five degrees. Thus the rolls facilitate movement of the matrix thereover and their inclination tends to keep the bottom of the edge groove in contact with the stop.

When rounding the toe end of the matrix, it is desirable to provide auxiliary feeding means to prevent wrinkling of the marginal portion of the canvas. Accordingly, a further feature of the invention consists in feeding means engaging the canvas where it extends beyond the matrix and where it is supported by a part which supports the stop or edge guide. The auxiliary feeding means may be brought into action at the will of the operator and preferably acts only in the interval between tucking movements of the tucking tool, thus allowing the tool to draw stock from the marginal portion of the canvas without interference by the auxiliary feed. As illustrated, a toothed wheel is arranged to be pressed yieldingly upon the marginal portion of the canvas by manually operated means, and the rate of rotation of the wheel is so timed with respect to the movements of the tucking tool that a portion of the wheel between the teeth is opposite the canvas during the downward movement of the tucking tool so that at that time the canvas is free to move toward the rib groove and the feeding of the canvas by a tooth occurs during the time when the tucking tool is raised out of the groove. The feeding of the marginal portion of the canvas while the tucking tool is raised prevents the formation of wrinkles in the canvas and is of special utility when operating at an end portion of the matrix.

The canvas is preferably stiffened with a thermoplastic resin applied to the side exposed as it lies on the matrix, the resin, of course, when cold substantially stiffening the canvas. Accordingly, a feature of the invention consists in means for heating the canvas to render it limp in the region operated upon. As illustrated, a blast of hot air is directed upon the canvas in the region where the tucking operation is occurring. The hot air thus renders successive portions of the canvas limp and facilitates the operation of the tucking tool and the action of the hammer in driving the core piece into the fold of canvas formed by the tucking tool.

A further feature of the invention consists in means for cutting off the core piece at the conclusion of the tucking operation. This cutting means may be operated by hand when the end of the groove in the edge face of the matrix on the finishing side engages the stop.

As a further feature of the invention, however, the severing of the core piece is performed automatically. For this purpose the stop or guide is in two parts, the part which engages the end of the edge groove at the beginning of the operation being fixed and the part which engages the end of the edge groove at the conclusion of the operation being a slightly movable trigger which is also a stop. This movement, which occurs when the end of the edge groove hits the trigger portion of the stop at the conclusion of the operation, is utilized to close a microswitch in the circuit of a solenoid, the armature of the solenoid being operatively connected to a knife which severs the core piece.

These and other features of the invention will appear more fully from the following description when read in connection with the accompanying drawings and will be pointed out in the appended claims.

In the drawings,

Fig. 2 is a side elevation of the base and column of the machine;

Fig. 3 is a view of the matrix and a piece of canvas or other sheet material constituting the work operated upon by the machine;

Fig. 4 is a side elevation of the head of the machine taken from the side opposite Fig. 1;

Fig. 5 is a front elevation of the head of the machine;

Fig. 6 is a plan view of the work support;

Fig. 7 is a plan view, partly in section, of a plate which supports the marginal portion of the canvas;

Fig. 8 is an elevation of the auxiliary feed mechanism;

Fig. 9 is a front elevation of parts shown in Fig. 8;

Fig. 10 is an enlarged detail view of the core-piece feeding mechanism;

Fig. 11 is a detail view of parts shown in Fig. 1;

Fig. 12 is an enlarged front elevation showing the mounting of the tucking tool and core-piece-severing knife;

Fig. 13 is an end view of parts shown in Fig. 12;

Fig. 14 is a detail of the core-piece-cutting knife shown in Fig. 12; and

Fig. 15 is a detail in perspective of the work feed foot.

Figure 1:
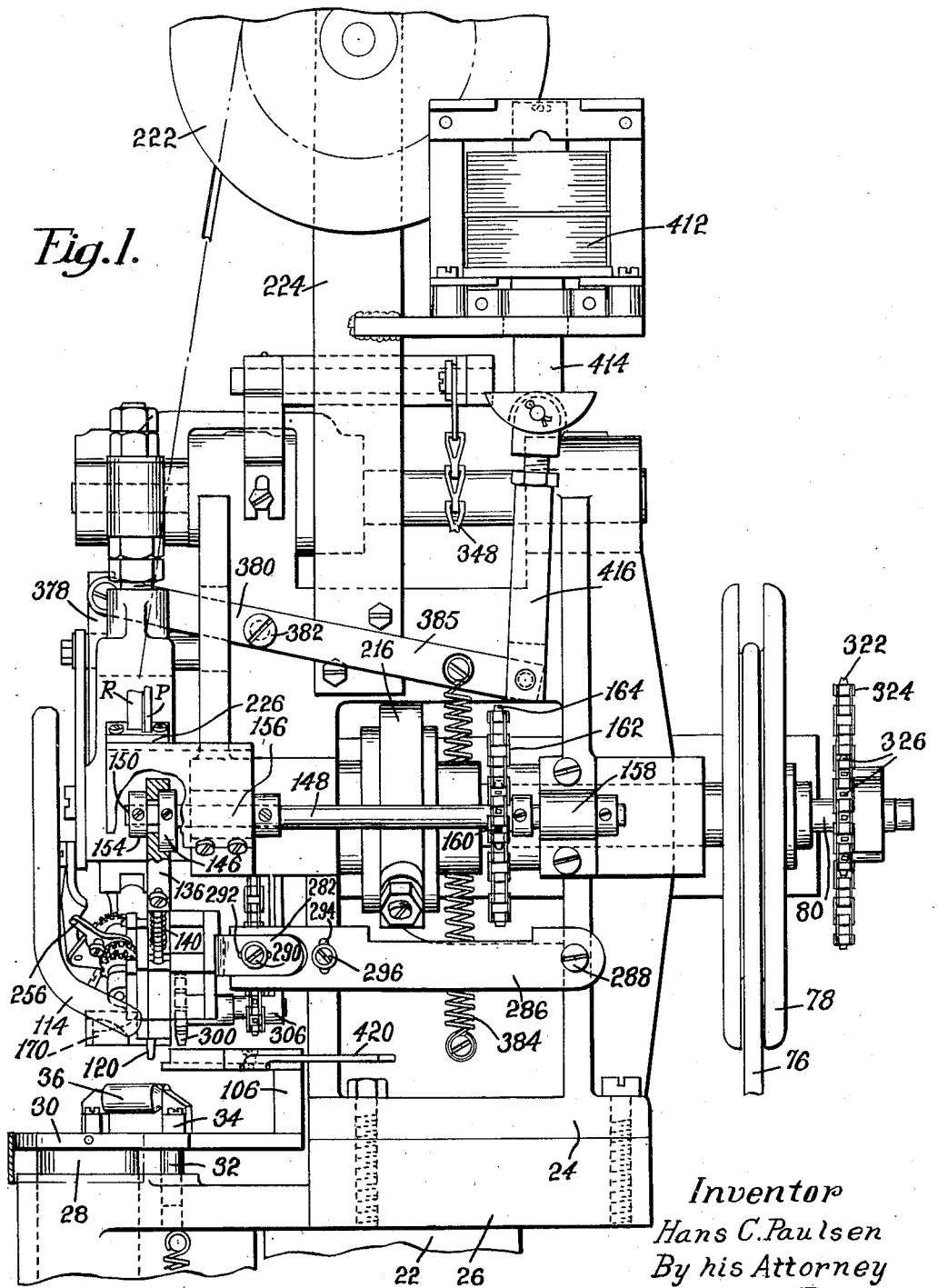
Fig. 1 is a side elevation of the head of the machine.

The machine comprises a column 20 (Fig. 2) in the upper end of which is arranged for vertical adjustment the neck 22 of a head frame 24. Secured to the head frame is a bracket 26 in which the stem 28 of a work-supporting table 30 slides vertically and is held from rotation by a vertical pin 32 (Fig. 4) seated in the bracket 26 and having a sliding fit in a hole in the table 30. On the table is secured a pair of bars 34 in which are supported the axes of a series of antifriction rolls 36. The axes of the rolls (Fig. 6) are parallel and horizontal but are inclined at about ninety-five degrees to the direction of feed so that they tend, as the matrix slides over them, to force the matrix toward the machine. The inner ends of the rolls are tapered to different longitudinal extents, a line D—F joining the beginnings of the tapers being parallel to the direction of feed. The bars 34 are at an angle of about five degrees to the direction of feed, that is, to the line D—F.

The stem 28 has secured to its lower end a member 38 (Figs. 4 and 5) to which is pivoted at 40 a link member 42 having an upward projection 44 which is held against a depending portion 46 of the bracket 26 by a spring 48 (Fig. 5) connected between two pins, one on the portion 46 and the other on the link member 42. Below its pivot 40 the link member 42 is pivoted at 49 to the lower end of the links 50 which at their upper ends are pivoted by a pin 52 to the bracket 26. The link member 42 and the links 50 constitute a normally straight inverted toggle holding the table 30 with its rolls 36 in fixed raised position. By rotating the link member 42 about its axis 40 in a clockwise direction (Fig. 5) against the spring 48, the toggle may be broken and the work support lowered. For this purpose, a chain 54 is attached to the link member and to a treadle lever 56 (Fig. 2) pivoted at 57 and carrying a treadle 58 depression of which will lower the work support.

The machine is driven by an electric motor 60 mounted on a bracket 62 secured on the column 20. The pulley 64 of the motor is connected by a belt 66 to a pulley 68 loose on a countershaft 70 mounted in a long bearing 72 in the lower part of the column and held from endwise movement. Fixed on the shaft is a grooved pulley 74 connected by a belt 76 to a pulley 78 (Fig. 1) on a main shaft 80 in the head of the machine. Between the pulleys 68, 74 (Fig. 2) is a friction disk 82. Above the shaft 70 is a bar 84 parallel thereto and mounted in bearings 86 to slide endwise. Fixed to the bar 84 are two members 88, 90, and when the bar is slid to the left the member 88 pushes the driving pulley 68 and friction disk 82 against the pulley 74 to cause it to be driven. When the bar is moved to the right, a brake 92 on the member 90 is applied to the driven pulley 74 to stop the machine. Movement of the bar 84 to the left is effected by depressing a treadle 94 connected by a link 96 to an arm 98 of an angle lever pivoted to the column at 99. The other arm 100 of the angle lever is forked to engage a transverse pin 102 on the bar 84. Reverse movement of the bar to stop the machine is effected by a tension spring 104 connected between the treadle 94 and the base of the machine.

The work consists of sheet material, such for example as canvas, placed on a matrix M (Fig. 3), which is preferably made in accordance with the disclosure of the second above-mentioned application. The two parallel faces of the insole-shaped matrix are each provided with a groove V corresponding to the location of a rib on an insole, the grooves being opposite each other. In the edge face of the matrix is a groove E the bottom of which is at a uniform predetermined distance from the rib grooves V. The matrix has a tang T near its rear end upon which a piece of canvas C larger than the face of the matrix may be impaled. The operator, after securing one end of the canvas on the tang, draws it straight and holds it in proper position to cover the matrix while he depresses the treadle 58, presents the work to the machine and releases the treadle.

Carried by the table 30 is an upright 106 having a horizontal plate 108 on which is a combined stop and edge guide 110 (Fig. 7) which runs along the bottom of the edge groove E of the matrix which is presented against the gage with its toe end toward the right (Fig. 5) and moved toewardly until an abutment A at the end of the groove E engages the stop 110, thus locating the matrix for the start of the operation of tucking the canvas into the groove.

In order that the fold of canvas tucked into the groove may form a firm and suitable sewing rib as well as provide greater body and strength in the completed insole, the canvas C, when applied to the matrix, has been treated with stiffening material on the exposed side and is also coated on that side with natural or synthetic latex or other suitable pressure-responsive cement. Since it is difficult to tuck the thus-stiffened canvas into the groove, it is desirable to render the canvas temporarily limp in the region where the tucking operation is occurring. When the stiffening material is resin or other thermoplastic material, heat for rendering the canvas limp is provided by a hot air blast apparatus 112 (Fig. 5) supported on the head of the machine with its hot air nozzle 114 (Figs. 1 and 4) directed at that portion of the canvas where the tucking operation is to begin. The apparatus 112 may be of a usual commercial type such, for example, as that disclosed in United States Letters Patent No. 1,777,744, granted October 7, 1930, and No. 1,869,737, granted August 2, 1932, in the name of A. A. Breuer.

The tucking tool 120 (Fig. 12) has a shank portion 122 which is recessed into a slide 124 and fastened therein by a screw 126. The slide 124 lies in a groove in a part 128 which is adjustably mounted on the head 24, as will be later explained, so that the slide will extend at about 45 degrees to the horizontal. The slide 124 is held in its groove by a plate 130 (Fig. 13). The upper end of the slide 124 has an offset portion 132 which is slotted at 133 to receive a headed stud 134 (Fig. 5). The stud 134 enters a pitman member 136 in which it is held by a screw 138, and between the pitman member and the offset 132 is a compression spring 140 surrounding the stud, the spring being seated in a recess 142 in the offset 132 and rendering the downward thrust of the tool yielding. By lifting the spring 140 from its recess the stud 134 may be removed from its slot, thus facilitating access to the slide 124. The rear face of the pitman member 136 (Figs. 1 and 11) is milled out to form parallel faces 144 at right angles to the direction of reciprocation of the pitman, between which faces an eccentric 146 is fitted. The eccentric is mounted on a horizontal shaft 148 in the end of which is a central pin 150 which enters a longitudinal slot 152 in the pitman 136. The members are held in place by a collar 154 on the pin 150. Rotation of the shaft, of course, reciprocates the pitman 136 and the tucking tool 120 to an extent determined by the throw of the eccentric 146.

The shaft 148 is mounted in bearings 156, 158 (Fig. 1) fixed in one side of the head frame 24 and carries a small sprocket 160 which is connected by a chain 162 to a larger sprocket 164 on the main shaft 80, the ratio of the smaller to the larger sprocket being 4 to 1. Accordingly, when the machine is in operation, the shaft 148 will be rapidly rotated and will communicate to the tucking tool 120 a rapid reciprocating motion rendered yielding by the spring 140, the tool thus acting to tuck the canvas into the groove V of the matrix.

To advance the work for the progressive action of the tool 120, a four-motion feed foot 170 (Figs. 5 and 15) is provided which engages the canvas on the matrix on each side of the fold formed therein by the tool 120. The feed foot 170 is attached by a screw 172 to a member 174, a rib 176 on the member engaging a horizontal groove in the feed foot 170, and the hole in the feed foot being elongated horizontally to permit adjustment of the foot laterally of the direction of feed. The member 174 has a cylindrical portion arranged to slide vertically in a bearing 178 on a yoke 180, the yoke being mounted on an eccentric portion 182 of the main shaft 80. Above the bearing 178 the member 174 is reduced in diameter and carries a sleeve 184 which is mounted in a bearing 186 on the yoke. On the reduced portion of the member 174 are two flanged washers, the lower one 188 resting on the larger portion of the member 174 and supporting a compression spring 190. The upper washer 192 rests on the spring and is engaged on top by the sleeve 184. Above the bearing 186 a pair of set nuts 194 is threaded on the sleeve 184 and above them is another pair 196 threaded on the member 174. Between these pairs of nuts is a block 198 to which is pivoted at 200 an arm 202 of a rocker 204 mounted on a shaft 206 (Fig. 4), the shaft having bearings 208, 210 on the head frame 24. Another arm 212 of the rocker is pivoted at 214 to a connecting rod 216 which is reciprocated by suitable means on the main shaft 80. This construction is more fully disclosed in Letters Patent of the United States No. 2,326,119, granted August 10, 1943, in the name of F. E. Bertrand. The arm 202 (Fig. 5) of the rocker is thus moved up and down and imparts its movement to the block 198 which, when moved upwardly, engages the nuts 196 and positively raises the feed foot 170 and, when moved downwardly, depresses the sleeve 184 which, through the spring 190, moves the feed foot down yieldingly. While the foot is down it is advanced by the eccentric 182 to feed the work and, when raised, it is moved back by the eccentric so that upon the next downward movement it engages the work for the next feed movement thereof.

The feed foot 170 has supplementary feed portions, one portion 217 being secured to the feed foot (Fig. 15). Another portion 218 extends rearwardly in the direction of feed, past the tucking tool 120, and has a portion 220 extending at right angles to the direction of feed. While the feed foot 170, by itself, is adequate for making insoles for shoes with broad toes, it is found that, in rounding the toe end of a matrix for pointed toes, the foot 170 would sometimes extend beyond the matrix and could not properly feed the work. The extension 218 enables the feed foot to maintain feeding contact with the work at all times whether the toe of the matrix is pointed or not. The portion 220 which is at the rear of the tool is of special utility in smoothing down or preventing wrinkles in the canvas near the end of the operation when the core piece is about to be cut off, as will be later explained.

It is desirable to introduce a core piece into the fold of canvas formed by the tucking tool 120 immediately after its formation. The core piece P (Figs. 1 and 13) may be a strip of suitable material rectangular in cross-section, or such a strip of material may be reinforced as illustrated by an L-shaped strip R of material such as canvas, one part of the strip being cemented to the core piece and the other projecting at right angles thereto. An indefinite length of the core piece is wound on a reel 222 (Fig. 1) on a support 224 from which the core piece passes through a guide 226 to a feed mechanism mounted on the part 128 in which is a groove 228 (Fig. 12) through which the core piece passes in a direction parallel to the tucking tool slide 124.

The feeding mechanism (Fig. 10) includes two parallel shafts 230, 232 between which the core piece P passes. The shaft 230 is mounted in bearings 234, 236 on the outer side of the member 128 and the shaft 232 is mounted in bearing blocks 238, 240 on the inner side thereof. On the shaft 230 is a toothed wheel 242 which engages one side of the core piece or the canvas reinforcement R thereon, and on the shaft 232 is a knurled wheel 244 which engages the opposite side of the core piece. The part 128 is locally milled away at 246 (Fig. 12) to allow contact of the feed wheel 244 with the rear side of the core piece, and the cover plate 130 is similarly milled away at 247 (Fig. 13) to allow contact of the toothed wheel 242 with the opposite side of the core piece. The shafts 230, 232 are geared together in a 1 to 1 ratio by meshing gears 250, 252 (Fig. 10) pinned on the shafts. On the shaft 230 is a gear or ratchet wheel 254, engaging which is a pawl 256 pivoted at 258 to a triangular lever 260 fulcrumed on the shaft 230. The pawl is held against the gear wheel by a torsion spring 262 on its pivot 258. The triangular lever 260 is pivoted at 264 to a link 266 (Fig. 5) the upper end of which is pivoted to a lever 268 fulcrumed at 270 on the head frame and having between its ends a slot 272 which is engaged by a pin or screw 274 mounted eccentrically in the eccentric portion 182 of the main shaft 80. The timing is such that the lever 268 moves counterclockwise to operate the pawl 256 and advance the core piece P while the feed foot 170 is advancing leftward to feed the work, the length of the core-piece feed being preferably slightly greater than the distance the work is fed by the feed foot. As the core piece is advanced over the fold of canvas in the groove of the matrix, it is engaged by the feed foot in its downward movement and forced into the fold progressively and concomitantly with the formation of the fold by the tool 120.

To enable the feed mechanism to handle core pieces of different thicknesses, the hole for the shaft 232 (Fig. 10) in the bearing block 240 is slightly elongated in a direction transverse to the core piece P. The block 140 is bored to receive a plunger 276 which engages the shaft 232 and is backed by a compression spring 278 located between the plunger and an end plate 280. The bearing for the shaft 232 in the block 238 is sufficiently loose to permit the required swinging movement of the shaft against the spring 278 to allow passage of core pieces P of nonuniform or different thicknesses.

The core-piece-feeding mechanism and the tucking tool are mounted on the head frame 24, as shown in Figs. 1 and 10. The end plate 280, which is secured to the bearing blocks 238, 240, has a tongue 282 (Fig. 10) secured thereto by a screw 284, the tongue (Fig. 1) being set into a member 286 pivoted at 288 to the head frame 24. The tongue is held in its recess in the member 286 by a screw 290 which extends through a horizontal slot 292 in the tongue and is threaded into the member 286. The slot 292 permits adjustment of the tool and connected mechanism horizontally. The member 286 has a vertical slot 294 through which a screw 296 extends and is threaded into the frame. By loosening this screw the tool 120 and core-piece-feeding mechanism may be adjusted vertically about the center 288, and, by loosening the screw 290, horizontal adjustment of the tongue relatively to the member 286 may be effected. The heightwise adjustment is to accommodate matrixes of different thicknesses and the horizontal adjustment enables the tucking tool to be located centrally of the groove V in the matrix.

In tucking the canvas into sharply curved portions of the groove V, as in rounding the toe, it is desirable to provide auxiliary feeding means for the work to avoid wrinkles in the canvas. The canvas C extends more or less beyond the periphery of the matrix, as shown in Fig. 8, where it rests on the plate 108 carried by the work-supporting table 30. Above the plate is a toothed wheel 300 having, for example, ten teeth. The wheel carries a sleeve 302 which is rotatable on a shaft 304 fixed to a lever arm 306, and a sprocket wheel 308 has its hub portion interlocked at 310 with the sleeve 302. The lever 306 (Fig. 5) is pivoted on a shaft 312 mounted in bearings 314, 316 (Fig. 4) secured to the left side of the head and carries a sprocket 318 corresponding in size to the sprocket 308 to which it is connected by a sprocket chain 320. On the rear end of the shaft 312 is a large sprocket wheel 322 connected by a chain 324 to a smaller sprocket wheel 326 on the main shaft 80 (Fig. 1), the ratio being 2½ to 1. With this ratio and with ten teeth in the feed wheel 300, the movement of the parts may be so timed that the engagement of a tooth on the wheel 300 to feed the canvas will occur during the withdrawal of the tool 120 and the space between the teeth will be over the canvas (Fig. 9) during the advance of the tool to tuck the canvas into the groove. Thus, the feed wheel will not interfere with the movement of the marginal portion of the canvas toward the groove during the tucking action of the tool, and the engagement of a tooth of the feed wheel with the marginal portion of the canvas while the tool is withdrawn will advance the canvas, thus preventing the formation of wrinkles therein.

In order that the auxiliary feed wheel 300 may be employed or not at the will of the operator, an arm 330 fixed to the arm 306 extends to the left (Fig. 5) and is bored to permit passage of a rod 332 therethrough. Between the arm 330 and a collar 334 on the rod is a compression spring 336 which may be held under initial compression by a collar 338 fixed on the rod above the arm 330. The rod passes loosely through an arm 340 of a lever fulcrumed between its ends to the reel support 224 by a pin 342. The rod is connected to the arm 340 by a pair of collars 344, one above and one below the arm. The other arm 346 of the lever is connected by a chain 348 to a treadle 350 (Fig. 2) pivoted at 352 to the base of the machine. A tension spring 354 (Fig. 5), connected at its upper end to the lever arm 340 and at its lower end to a bracket 356 on the frame 24, is provided to turn the lever 340, 346 counterclockwise to lift the feed wheel 300 from engagement with the work. When the operator desires the assistance of the auxiliary feed wheel, for example when rounding the toe, he depresses the treadle 350, overcomes the spring 354 and causes the feed wheel 300 to be pressed against the canvas with a force determined by the stress of the spring 336. When the canvas has been tucked and the core piece inserted throughout the extent of the groove V, the abutment A at the opposite end of the edge groove E in the matrix M will engage the stop 110 or a trigger adjacent thereto, to be described, thus arresting further feed movement of the work and indicating to the operator that the machine should be stopped by releasing the treadle 94.

The core piece now has to be severed, and for that purpose a knife 360 (Figs. 4, 12 and 14) is provided. The knife is cylindrically curved and is mounted on a carrier 362. The carrier is bifurcated to embrace a portion 366 of the member 128 (Fig. 12) to which it is pivoted by a pin 368 at the center of curvature of the blade 360. In its movement about the pin 368 the blade passes over a similarly curved surface 370 on the member 128. The side of the knife next to the tucking tool is cut away to clear the tool and its edge is inclined relatively to an adjacent edge 372 of the part 128 to produce a shear cut as it passes by the corner 372 of the part 128, thus severing in a plane substantially parallel to the upper surface of the matrix the portion of the core piece which has been inserted in the groove from the portion passing downwardly through the groove 228. This groove, as clearly shown in Fig. 13, is partly covered by the plate 136, a slot 374 being left along its upper edge through which the outwardly directed marginal portion of the reinforcement R can pass. Connected at 376 to the knife carrier 362 is a link 378 the upper end of which (Figs. 1 and 4) is connected to a lever 380 fulcrumed at 382 on the head frame. A tension spring 384, which is connected at its upper end to the rear arm 385 of the lever 380 and at its lower end to the frame, holds the knife 360 in retracted position.

Means is provided for operating the knife automatically when the end of the operation is reached. For this purpose the stop 110 is made in two parts (Fig. 7), one part being fixed for locating the matrix at the beginning of the operation and the other part 386 being movable slightly when engaged by the abutment at the end of the groove E at the conclusion of the operation. The part 386 may therefore be appropriately called a trigger. The trigger 386 is on the end of an arm 388 of an angle lever pivoted at 390 on the under side of the plate 108 which supports the marginal portion of the canvas. Another arm 392 of the angle lever has threaded through it a screw 394 which is held in adjusted position by set nuts 396. The screw is arranged to engage, in any heightwise position of the plate 108, a block 398 secured to the end of a sliding rod 400 held retracted by a tension spring 402 connected at one end to a fixed pin 404 (Fig. 4) and at the other end to a collar 406 on the rod 400. The block 398 is guided for horizontal movement and the rod 400 held from rotation by a fixed screw stud 408 which engages a vertical slot in the lower end of the block. When, at the completion of the tucking operation, the abutment A at the end of the groove E engages the trigger 386, the rod 400 will be moved to the left sufficiently to close a microswitch 410 arranged in circuit with a solenoid 412 (Fig. 1) the armature 414 of which is connected by a link 416 to the end of the rear arm 385 of the lever 380 which is connected to the upper end of the link 378, the lower end of which is pivoted to the knife carrier 362. The wires conducting current to the solenoid 412 through the microswitch 410 are indicated at 418 (Fig. 4).

When, at the conclusion of the tucking operation, the abutment A at the end of the slot E in the edge face of the matrix M engages the trigger 386, the microswitch will be closed, whereupon the solenoid 412 will be energized, the armature 414 jerked up, and the lever 380 operated to push down the link 378 to cause the knife to sever the core piece.

The trigger may be operated at any time to cause the core piece to be severed by means of a handle 420 (Figs. 1 and 7) formed as part of the angle lever 388, 392 and located so as to be conveniently engaged by the operator's hand.

It should be understood that the term "canvas" as used in this specification is purely illustrative of the material which may be operated upon by the machine and that any other suitable sheet material may be used in place of it.

Having thus described my invention, what I claim as new and desire to secure by Letters Patent of the United States is:

1. A machine for working canvas into a groove in an insole-shaped matrix, said groove corresponding in extent and location to the extent and location of the rib of a welt insole, comprising a matrix support, means for working a portion of the canvas into the groove of the matrix, means for feeding the matrix and the canvas thereon to effect the progressive working of the canvas into the groove, and means for progressively presenting and inserting a core piece into the fold of canvas in the groove.

2. A machine for working canvas into a groove in an insole-shaped matrix, said groove corresponding in extent and location to the extent and location of the rib of a welt insole, comprising a matrix support, means for working a portion of the canvas into the groove of the matrix, means for effecting relative movement between the working means and the matrix to cause progressive action of the working means upon the work to insert a fold of canvas into the groove, and means for inserting a strip of material into the fold of canvas progressively as the fold is formed.

3. A machine for forming an article from sheet material having, in combination, means for forming and forcing a fold of the sheet material into a groove in a matrix, means for presenting a core piece adjacent to the fold so formed, and means engaging the core piece and forcing it into the fold.

4. A machine for forming an article from sheet material having, in combination, means for forcing a fold of the sheet material into a groove in a matrix, means for presenting a core piece adjacent to the fold so formed, and a hammer for engaging the core piece and hammering it into the fold.

5. A machine for working sheet material into the groove in a free grooved matrix comprising a support for the matrix, means for forcing a portion of the sheet material into the groove to form a fold therein, means for inserting material into the fold to fill it, and means for advancing the matrix to cause the fold-forming and fold-filling operations to take place progressively.

6. A machine for working canvas into the groove of a grooved insole-shaped matrix comprising a support for the matrix, a continuously reciprocating tucking tool operating to tuck the canvas into the groove, means for intermittently advancing the work to render the tucking operation progressive, said tucking tool being bodily inclined at an obtuse angle to the portion of the groove into which the canvas has been tucked, and means for presenting a core piece in said angle to be forced by the advancing means into the fold of the tucked canvas.

7. A machine for working sheet material into a marginal groove in an insole-shaped matrix comprising means for supporting the matrix in a horizontal position, a vertically reciprocating tool operating to tuck a portion of the sheet material into the groove to form a fold therein, and work-feeding means lying across the fold so formed and acting to advance the work.

8. A machine for working sheet material into the groove of a grooved matrix comprising a work support, a reciprocating tool operating to tuck a portion of the material into the groove, and work-feeding means engaging the work in advance of the tool and having a portion engaging the work at the rear of the tool whereby wrinkles in the sheet material are prevented or smoothed down.

9. A machine for working canvas into a groove of an insole-shaped matrix comprising a work support, an edge guide for the matrix, means for urging the matrix toward the edge guide, means for working a portion of the canvas into the groove, and means for feeding the matrix and canvas whereby the working means acts progressively to insert the canvas into the groove throughout its extent.

10. A machine for working canvas into the groove of a grooved matrix comprising a work support, means for feeding the matrix intermittently, and a continuously reciprocating tucking tool acting in a direction inclined to the direction of feed to tuck the canvas into the groove progressively as the matrix is fed, the tool operating a plurality of times between feed movements of the matrix.

11. A machine for working canvas progressively into a rib groove of a matrix which has also an edge groove the bottom of which is at a uniform distance from the rib groove comprising a guide running in the edge groove, a support for the matrix including a series of rolls upon which the matrix rests, the axes of the rolls being inclined to the direction of feed, means for feeding the matrix, and means for inserting the canvas into the rib groove as it is fed.

12. A machine for working canvas progressively into a rib groove of an insole matrix which has also an edge groove ending at the breast line, the bottom of said groove being at a uniform distance from the rib groove, comprising a guide running in the edge groove, means for feeding the matrix, a trigger adjacent to the guide, a support for the matrix including a series of rolls upon which the matrix rests, the axes of the rolls being inclined to the direction of feed to crowd the matrix against the edge guide, means for inserting the canvas into the rib groove as it is fed, means for inserting a core piece into the groove, means for severing the core piece, a solenoid for operating the core-severing means, and means operated by the trigger when the end of the edge groove is reached for energizing the solenoid.

13. A machine for working heat-responsive sheet material into a rib groove of an insole-shaped matrix comprising means for heating the material at the working point, means for tucking the material rendered limp by the heat into the groove, means for inserting material into the fold so formed and means for advancing the matrix to render the heating and tucking operations progressive.

14. In a machine for working sheet material carrying a thermoplastic into a groove in an insole-shaped matrix comprising a tool for working a portion of the material into the groove to form a fold therein, means for blowing hot air upon the material in the region worked on to render it limp, means for introducing material into the fold so formed, and means for advancing the matrix and material to cause successive portions of the limp material to be worked into the groove.

15. A machine for working resin-coated canvas into a groove in an insole matrix comprising a matrix support, a reciprocating tool for forcing the canvas into the groove of the matrix, means for treating the portion of the canvas being worked into the groove with a blast of hot air, means for presenting a core piece over the groove, and a four-motion feed foot acting first to force the core piece into the groove formed in the canvas and then to advance the matrix whereby the operations are performed progressively throughout the extent of the groove.

16. A machine for working stiff resin-coated canvas into the groove of a matrix comprising a reciprocating tool acting to force a fold of canvas into the groove, means for heating the canvas in the region of the action of the tool to render the canvas limp, means for presenting a core piece adjacent to the fold in the canvas, and an intermittently operating hammer acting first to force the core piece into the fold of the canvas and then moving in the direction of extent of the groove to advance the work whereby the canvas is progressively heated, the fold progressively formed and the core piece progressively inserted into the fold.

17. A machine for working a portion of a sheet of canvas into a groove comprising a reciprocating tool acting to force a fold of canvas into the groove, means for presenting a core piece adjacent to the fold so formed, and means operated to engage the core piece to force it into the fold of canvas and to move in the direction of the groove to advance the work for the progressive action of the tool thereon.

18. A machine for working sheet material into a groove in an insole matrix comprising a matrix support, a reciprocating tool for forcing the material into the groove of the matrix, means for presenting a core piece over the groove, a four-motion feed foot acting first to force the core piece into the groove formed in the material and then to advance the matrix, and means to feed the core piece at a rate greater than that at which the matrix is fed.

19. A machine for working a portion of a sheet of canvas into a groove comprising a yieldingly reciprocated tucking tool to form a fold of canvas into the groove, means for presenting a core piece over the fold of canvas, and a four-motion feed foot acting to force the core piece into the fold and to feed the work whereby the fold in the canvas is progressively formed into the groove throughout its extent and the core piece inserted therein throughout the extent of the fold of canvas.

20. In a machine for working a portion of a sheet of canvas into a groove in an insole matrix, means for tucking the canvas into the groove, means for presenting a core piece over the groove, and a member having orbital movement, one component of its movement being in a direction to push the core piece into the fold made in the canvas by the tucking tool and another component being in a direction to advance the matrix whereby a new portion of the core piece is presented to be acted upon by the member on its next pushing movement.

21. A machine for working a portion of a sheet of canvas into a groove comprising a reciprocating tool acting to force a fold of canvas into a groove, means for presenting a core piece adjacent to the fold so formed, and means operating to engage the core piece to force it to enter the fold of canvas and to move in the direction of the groove to advance the work for the progressive action of the tool thereon, a knife for severing the core piece, and means for automatically operating the knife at the conclusion of the tucking operation.

22. In a machine for working a portion of a sheet of canvas into a groove in an insole matrix, means for tucking the canvas into the groove, means for presenting a core piece over the groove, a core-piece-inserting tool acting downwardly to push the core piece into the fold of canvas and then horizontally to advance the matrix, and means for feeding the core piece a distance greater than the horizontal movement of the tool.

23. A machine for working a portion of a sheet of canvas into a groove comprising a yieldingly reciprocated tucking tool acting to push a fold of canvas into the groove, means for presenting a core piece over the fold so formed, a feed foot, means for yieldingly actuating the feed foot downwardly to force the core piece into the fold of the canvas, and means for moving the feed foot in the direction of the extent of the groove at the tucking point to advance the work and cause the fold-forming and core-piece-inserting operations to be performed progressively throughout the extent of the groove.

24. A machine for working a portion of a sheet of canvas into a groove in a matrix comprising a yieldingly reciprocated tucking tool acting to push a fold of canvas into the groove of the matrix, means for presenting a core piece over the fold so formed, a feed foot, means for yieldingly actuating the feed foot downwardly to force the core piece into the fold of the canvas, and means for moving the feed foot in the direction of the extent of the groove at the tucking point to advance the canvas and matrix to cause the fold-forming and core-piece-inserting operations to be performed progressively throughout the extent of the groove.

25. In a machine for inserting a core piece and a fold of canvas into a rib groove in a matrix comprising a canvas tucking tool, means for reciprocating the tucking tool in a direction inclined at about forty-five degrees to the direction of extent of the groove, means for rendering the tucking movement of the tool yielding, a core-piece guide for presenting the end of the core piece over the groove adjacent to the tucking tool, means for feeding the core piece through the guide, a feed foot, means for moving the feed foot yieldingly heightwise to force the core piece into the fold flush with the canvas, and means for moving the feed foot lengthwise of the groove to advance the work and cause the fold-forming and core-piece-inserting operations to be performed progressively throughout the extent of the groove.

26. A machine for working stiff resin-coated canvas into a groove of a matrix comprising a reciprocating tool acting to force a fold of canvas into the groove, means for heating the canvas in the region of the action of the tool to render the canvas limp, means for presenting a core piece adjacent to the fold in the canvas, an intermittently operating hammer acting first to force the core piece into the fold of the canvas and then moving in the direction of extent of the groove to advance the work whereby the canvas is progressively heated, the fold progressively formed and the core piece progressively inserted into the fold, means for severing the core piece, and means controlled by the matrix for initiating the action of the core-piece-severing means.

27. A machine for working a portion of a sheet of canvas into a groove comprising a reciprocating tool acting to force a fold of canvas into the groove, means for presenting a core piece adjacent to the fold so formed, means operated to engage the core piece to force it into the fold of canvas and to move in the direction of the groove to advance the work for the progressive action of the tool thereon, and means for severing the core piece.

28. A machine for working a portion of a sheet of canvas into a groove comprising a reciprocating tucking tool to form a fold of canvas in the groove, a guide for presenting a core piece over the fold so formed, means for pushing the core piece into the fold and advancing the work, a knife acting across the end of the guide for severing the core piece at the end of the tucking operation, and means for operating the knife.

29. A machine for working a portion of a sheet of canvas into a groove comprising a reciprocating tucking tool to form a fold of canvas in the groove, a guide for presenting a core piece over the fold so formed, means for pushing the core piece into the fold and advancing the work, means for arresting the work at the conclusion of the tucking operation, a knife acting across the end of the guide for severing the core piece, means for actuating the knife, and means for initiating the action of the knife when the work is arrested.

30. A machine for working a portion of a sheet of canvas into a rib groove of an insole matrix, said groove stopping at the breast line, comprising a yieldingly reciprocated tucking tool to form a fold of canvas in the groove, means for presenting a core piece over the fold of canvas, a four-motion feed foot acting to force the core piece into the fold and to feed the work whereby the fold in the canvas is progressively formed into the groove throughout its extent and the core piece inserted therein throughout the extent of the fold of canvas, and means acting without attention on the part of the operator for cutting off the core piece when the end of the groove is reached.

31. A machine for working a portion of a sheet of heat-softenable material into a groove in an insole-shaped matrix comprising a tool for working a portion of the material into the groove to form a fold in the material, means for heating the portion of material worked on to render it limp, means for inserting a flanged core piece into the fold made in the material with the flange extending inwardly of the matrix, and means for advancing the work and matrix to cause successive portions of the material to be heated, the limp material to be progressively worked into the groove and the fold filled.

32. A machine for operating on canvas placed over a grooved insole-shaped matrix and extending beyond the matrix comprising means for feeding the matrix, a reciprocating tool for working the canvas into the groove of the matrix as it is fed, and auxiliary feeding means acting during retraction of the tool to assist said matrix-feeding means.

33. A machine for operating on canvas placed over a grooved insole-shaped matrix and extending beyond the matrix comprising means for feeding the matrix and canvas, means for working the canvas into the groove of the matrix as it is fed, and auxiliary feed means engaging the canvas beyond the matrix to avoid wrinkling of the canvas as it is formed into the groove at an end portion of the matrix.

34. A machine for operating on canvas placed over a grooved insole-shaped matrix and extending beyond the matrix comprising a support for the canvas beyond the matrix, means for feeding the matrix and canvas, a reciprocating tucking tool for working the canvas into the groove of the matrix as it is fed, a toothed auxiliary feed wheel engaging the canvas beyond the matrix, and means for operating the toothed wheel in timed relation to the reciprocating tool so that the tucking occurs while a portion of the wheel between the teeth is over the canvas so as not to interfere with the tucking operation.

35. A machine for forming canvas into a rib groove of an insole-shaped matrix, said groove ending at the breast line, said matrix having a groove on its edge face the bottom of which is at a uniform distance from the rib groove and ending in abutments at the breast line, comprising a guide engaging the bottom of said groove and engageable with one abutment to determine the beginning of the operation, means for feeding the matrix, and means for tucking the canvas into the groove progressively as the matrix is fed, said guide determining the end of the operation when the other abutment is reached.

36. A machine for forming canvas into a rib groove of an insole matrix which has a surface on its edge face at a uniform distance from the rib groove and ending in abutments at the breast line comprising a fixed guide engaging said edge-face surface and engageable with one abutment to determine the beginning of the operation, means for tucking a portion of the canvas into the rib groove, means for presenting a core piece over the groove, means for forcing the core piece into the groove and feeding the work, means for cutting off the core piece, and a trigger adjacent to and movable against said guide for determining the end of the operation and initiating the operation of the knife.

37. A machine for working sheet material into a marginal groove in an insole-shaped matrix comprising a support for the matrix, a reciprocating tool operating to tuck a portion of the sheet material into the groove to form a fold therein, and a four-motion feed foot engaging the work across the fold therein both in front of and at the rear of the fold-forming tool.

38. A machine for working sheet material into a groove in a free grooved matrix comprising a support for the matrix, means for forcing a portion of the sheet material into the groove to form a fold therein, means for inserting a flanged core piece into the fold with the flange directed inwardly of the matrix, and means for pressing the flange upon the sheet material and advancing the matrix to cause the fold-forming, fold-filling and flange-pressing operations to take place progressively.

HANS C. PAULSEN.

REFERENCES CITED

The following references are of record in the file of this patent:

UNITED STATES PATENTS

| Number | Name | Date |
|---|---|---|
| 319,740 | Meise | June 9, 1885 |
| 563,082 | Sleeper | June 30, 1896 |
| 607,396 | Seaver | July 12, 1898 |
| 1,667,948 | Perry | May 1, 1928 |
| 2,018,866 | O'Donnell | Oct. 29, 1935 |
| 2,242,248 | Griswold et al. | May 20, 1941 |
| 2,253,732 | Segelin et al. | Aug. 26, 1941 |

FOREIGN PATENTS

| Number | Country | Date |
|---|---|---|
| 211,177 | Germany | Jan. 25, 1909 |
| 211,776 | Germany | July 15, 1909 |